US009303556B2

(12) United States Patent
Chevalier et al.

(10) Patent No.: US 9,303,556 B2
(45) Date of Patent: *Apr. 5, 2016

(54) METHOD FOR OPERATING A TURBOCHARGER ARRANGEMENT AND CONTROL UNIT FOR A TURBOCHARGER ARRANGEMENT

(75) Inventors: Alain Marie Roger Chevalier, Henri-Chapelle (BE); Simon Petrovic, Aachen (DE); Arno Bartsch, Maastricht (NL)

(73) Assignee: Ford Global Technologies, LLC, Dearborn, MI (US)

( * ) Notice: Subject to any disclaimer, the term of this patent is extended or adjusted under 35 U.S.C. 154(b) by 325 days.

This patent is subject to a terminal disclaimer.

(21) Appl. No.: 13/399,827

(22) Filed: Feb. 17, 2012

(65) Prior Publication Data

US 2012/0210710 A1  Aug. 23, 2012

(30) Foreign Application Priority Data

Feb. 21, 2011  (EP) .................................... 11155167

(51) Int. Cl.
| F02D 23/00 | (2006.01) |
| F02B 37/18 | (2006.01) |
| F02B 37/013 | (2006.01) |
| F02B 39/16 | (2006.01) |
| F02D 41/00 | (2006.01) |
| F02D 41/22 | (2006.01) |
| F02B 37/00 | (2006.01) |
| F02D 41/14 | (2006.01) |
| F02D 41/18 | (2006.01) |

(52) U.S. Cl.
CPC .............. F02B 37/183 (2013.01); F02B 37/002 (2013.01); F02B 37/013 (2013.01); F02B 39/16 (2013.01); F02D 41/0007 (2013.01); F02D 41/221 (2013.01); F01N 2900/1406 (2013.01);

(Continued)

(58) Field of Classification Search
CPC ........... F02B 2039/168; F02D 41/1445; F02D 41/1448; F02D 41/18; F02D 2200/0406; F01N 2900/1406; F01N 2900/1411; Y02T 10/40
USPC ................. 60/602, 611, 612, 605.1; 123/562; 73/114.06, 114.69, 114.76
See application file for complete search history.

(56) References Cited

U.S. PATENT DOCUMENTS 5,987,888 A * 11/1999 Weisman et al. ................ 60/612
6,055,812 A *  5/2000 Trumbower .................... 60/612

(Continued)

FOREIGN PATENT DOCUMENTS

DE  102008018133 A1 *  3/2010  .............. F02B 39/16
FR  2937379 A1  4/2010

(Continued)

OTHER PUBLICATIONS

ISA European Patent Office, Search Report of EP11155167.7, Jun. 14, 2011, Netherlands, 6 pages.

*Primary Examiner* — Jorge Pereiro
*Assistant Examiner* — Jason T Newton
(74) *Attorney, Agent, or Firm* — Julia Voutyras; Alleman Hall McCoy Russell & Tuttle LLP

(57) ABSTRACT

A method for operating a turbocharger arrangement of an internal combustion engine, the turbocharger arrangement comprising a low-pressure and a high-pressure turbocharging stage arranged sequentially, the low-pressure turbo-charging stage comprising a low-pressure turbine with a sensorless low-pressure turbine bypass valve, is provided. The method comprises evaluating at least one sensor signal of the turbocharger arrangement for detecting a failure mode of the sensorless low-pressure turbine bypass valve. In this way, the low-pressure turbine bypass valve may be monitored for degradation without utilizing a position sensor.

19 Claims, 5 Drawing Sheets

(52) U.S. Cl.
CPC ... *F01N 2900/1411* (2013.01); *F02B 2039/164* (2013.01); *F02B 2039/166* (2013.01); *F02B 2039/168* (2013.01); *F02D 41/1445* (2013.01); *F02D 41/1448* (2013.01); *F02D 41/18* (2013.01); *F02D 2200/0406* (2013.01); *Y02T 10/144* (2013.01); *Y02T 10/40* (2013.01)

(56) References Cited

U.S. PATENT DOCUMENTS

| | | | |
|---|---|---|---|
| 7,926,335 B2 * | 4/2011 | Wegener et al. | 73/114.79 |
| 2004/0216519 A1 * | 11/2004 | Baeuerle | 73/118.1 |
| 2007/0289302 A1 * | 12/2007 | Funke et al. | 60/602 |
| 2009/0077965 A1 * | 3/2009 | Pursifull | 60/602 |
| 2009/0082936 A1 * | 3/2009 | Andreae et al. | 701/102 |
| 2011/0036086 A1 * | 2/2011 | Liu et al. | 60/602 |
| 2011/0154892 A1 * | 6/2011 | Ibuki et al. | 73/114.79 |

FOREIGN PATENT DOCUMENTS

| | | | | |
|---|---|---|---|---|
| JP | 4017723 A1 | 1/1992 | | |
| JP | 4047125 A | 2/1992 | | |
| JP | 2010216402 A * | 9/2010 | | F02B 39/16 |
| WO | WO 2010041544 A1 * | 4/2010 | | F02B 39/16 |
| WO | 2011007455 A1 | 1/2011 | | |

* cited by examiner

METHOD FOR OPERATING A TURBOCHARGER ARRANGEMENT AND CONTROL UNIT FOR A TURBOCHARGER ARRANGEMENT

RELATED APPLICATIONS

The present application claims priority to European Patent Application No. 11155167.7, filed on Feb. 21, 2011, the entire contents of which are hereby incorporated by reference for all purposes.

FIELD

The present disclosure relates to a method for operating a turbocharger arrangement of an internal combustion engine and a control unit for such a turbocharger arrangement.

BACKGROUND AND SUMMARY

Internal combustion engines, in particular diesel and gasoline engines, are frequently equipped with turbochargers. A turbocharger operates by compression of the intake airflow into the engine in order to achieve more power. In particular, a predetermined power can be generated by a turbocharged engine with a smaller displacement volume and thus smaller size and less weight, thereby achieving an increased specific power and a reduction of fuel consumption.

In general, turbochargers are driven by the exhaust flow of the internal combustion engine. To this end, a turbocharger comprises a turbine arranged in the exhaust flow of the internal combustion engine, driving a compressor for compressing the intake airflow of the engine via a connecting drive shaft.

Recently, multi-stage sequential turbocharging has become popular. A regulated two-stage turbocharging system comprises a low-pressure (LP) stage for peak power and a high-pressure (HP) stage for fulfilling the back pressure requirements for driving exhaust gas recirculation, which is needed for NOx pollutant emission reduction. Moreover, the HP turbine usually is smaller and more responsive than the LP turbine. The HP and LP turbines are arranged sequentially in the exhaust flow of the internal combustion engine, the LP turbine being located downstream the HP turbine. The LP and HP compressors are arranged sequentially as well, the HP compressor being located in the intake airflow downstream the LP compressor.

The exhaust flow and/or the intake airflow are controlled by one or more bypass valves located in branches of the exhaust and/or intake system, which are parallel to the respective turbine and/or compressor. In particular, the exhaust flow may be controlled by a bypass valve of the HP turbine and/or a wastegate for bypassing the LP turbine. With the bypass valve closed, the respective turbine is driven maximally, while with the bypass valve partially or fully opened, the parallel branch is passed by at least part of the exhaust flow, the respective turbine being driven at a reduced rate. Similarly, the intake airflow may be controlled by a compressor bypass valve of the HP compressor. The bypass valves ensure a smooth operation of the engine and also ensure respecting various further constraints, concerning for example exhaust composition, compressor outlet temperature and turbine inlet temperature, as well as avoiding turbocharger surge or overspeed.

The bypass valves may be controlled actively, for example, electrically or by vacuum, and may comprise a position feedback sensor. As the HP turbine bypass valve is critical to emissions control, it is usually actively controlled and equipped with a position feedback sensor. The compressor bypass valve usually is passive, i.e. it opens or closes due to the pressure difference across it, having only two possible positions, which are the fully open and the fully closed positions. The amount of pressure difference required to operate the compressor bypass valve is determined by the design of the valve, for example, by the stiffness of a spring acting on the valve. The compressor bypass valve may or may not be equipped with a position feedback sensor. The wastegate is usually also actively actuated, however, for reduction of cost and complexity, it often does not comprise a position feedback sensor.

The active valves usually have a default or "failsafe" position into which they move when there is no vacuum or electrical supply. The failsafe position normally is either fully open or fully closed. The default setting is determined by factors such as safety and engine power requirements at altitude. However, due to a variety of reasons, the low-pressure turbine bypass valve may fail, being stuck in the fully closed or in the fully open position, for example. It would be desirable to be able to detect such failure of the wastegate, without a position feedback sensor involving increased cost and complexity.

The inventors have recognized the issues with the above approach and herein provide a method to at least partly address them. In one embodiment, a method for operating a turbocharger arrangement of an internal combustion engine, the turbocharger arrangement comprising a low-pressure and a high-pressure turbocharging stage arranged sequentially, the low-pressure turbo-charging stage comprising a low-pressure turbine with a sensorless low-pressure turbine bypass valve, comprises evaluating at least one sensor signal of the turbocharger arrangement for detecting a failure mode of the sensorless low-pressure turbine bypass valve.

In this way, engine operating parameters may be used to determine a position of the low-pressure turbine bypass valve. If it is determined that the low-pressure turbine bypass valve has degraded, for example if the valve is stuck in a fully open or fully closed position, control of engine boost pressure may be adapted to compensate for the degraded valve. Further, the position of the valve may be determined without using a position sensor, lowering costs and reducing control strategy complexities and resources.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
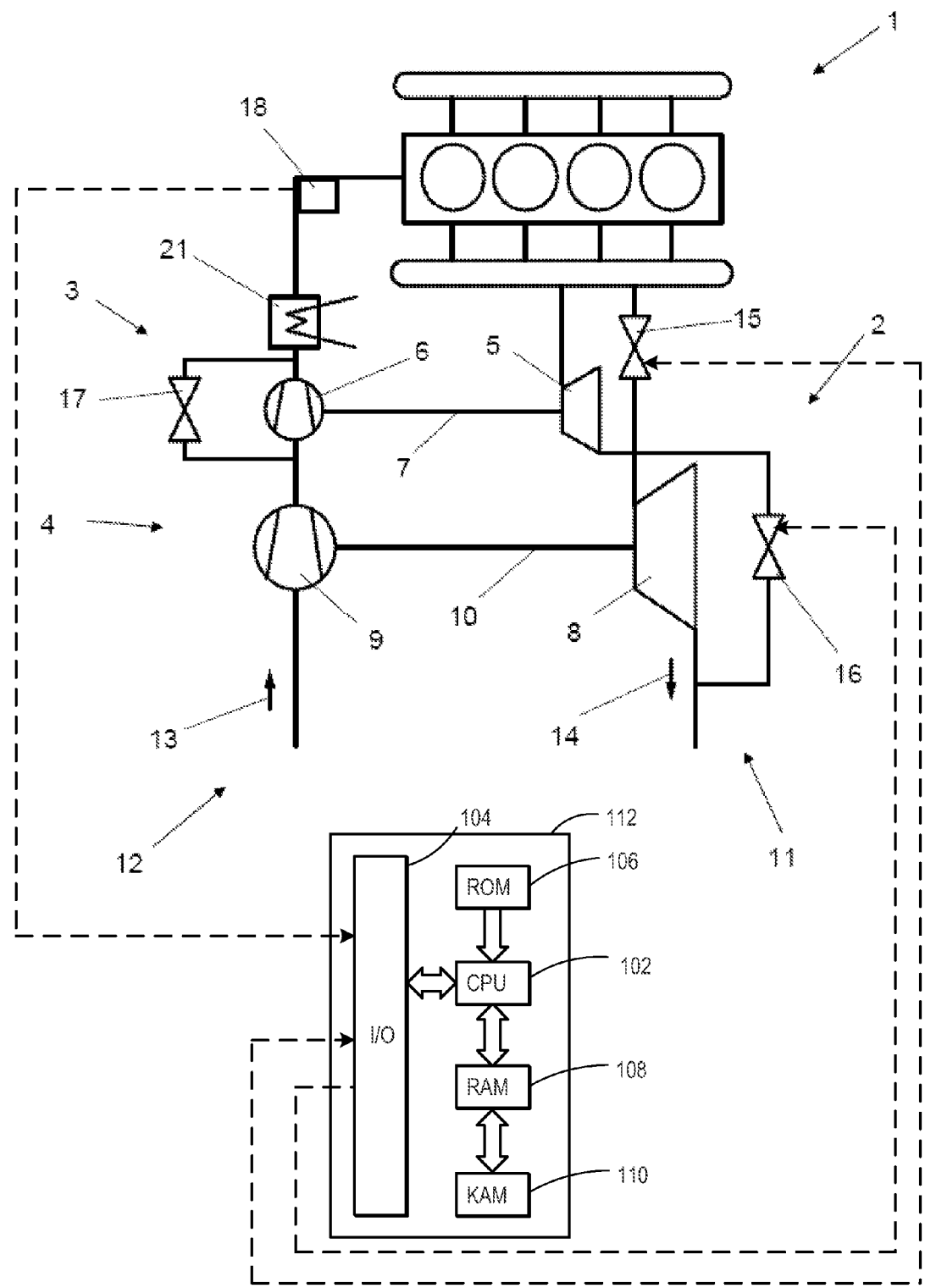
FIG. 1 shows a simplified block diagram of an internal combustion engine with a turbocharger arrangement.

A turbocharger arrangement of an internal combustion engine refers to a turbocharger arrangement or turbocharger system comprising a low-pressure turbocharging stage and a high-pressure turbocharging stage, which are arranged sequentially. The low-pressure turbocharging stage comprises a low-pressure turbocharger, which, in particular, comprises a low-pressure turbine driving a low-pressure compressor. The high-pressure turbocharging stage comprises a high-pressure turbocharger, comprising a high-pressure turbine driving a high-pressure compressor. The high-pressure compressor is arranged downstream the low-pressure compressor in the intake airflow of the internal combustion engine. The low-pressure turbine is located downstream the high-pressure turbine in the exhaust flow of the engine.

The low-pressure turbine exhibits a low-pressure turbine bypass valve (wastegate), which is not equipped with a position sensor providing a feedback signal representative of the actual position of the valve. In particular, the low-pressure turbine bypass valve is actuated actively, for example, by vacuum or electric transmission means. The low-pressure turbine bypass valve may be operated in a closed-loop control, employing the boost pressure for controlling the valve, without a dedicated position feedback sensor.

According to the present disclosure, at least one sensor signal of the turbocharger arrangement is evaluated for detecting a failure mode of the low-pressure turbine bypass valve. As the low-pressure turbine bypass valve does not comprise a position feedback sensor, the at least one sensor signal is provided by a sensor of the turbocharger arrangement other than a wastegate position feedback sensor. Such other sensor may be required for the operation of the turbocharger arrangement, the signal of which is thus available for evaluation. The signal of the sensor is evaluated in such a manner as to provide an indication of a possible failure of the low-pressure turbine bypass valve.

By evaluating a signal of a sensor of the turbocharger arrangement for detecting a failure mode of the low-pressure turbine bypass valve, it is possible to detect such a failure mode without the need for a position feedback sensor of the low-pressure turbine bypass valve. In this way, a diagnostic method for detecting failure of the wastegate is provided, without the additional cost and complexity which would be associated with a dedicated wastegate position sensor.

According to embodiments of the disclosure, the at least one sensor signal is a signal representative of intake mass airflow, boost pressure, exhaust flow, exhaust pressure downstream the low-pressure turbine, and/or turbocharger speed. Such a signal may be provided by a corresponding dedicated sensor. Sensor signals suitable for detecting a failure mode of the low-pressure turbine bypass valve are commonly available in two-stage turbocharged engines of cars complying with modern environmental regulations, for example EURO VI. A single signal or a combination of some or all such sensor signals available may be evaluated.

In particular, the intake mass airflow of the internal combustion engine may be measured by a sensor situated within the intake airway, for example directly downstream of the air filter and, in order to account for the flow through the compressor bypass valve, downstream of the downstream junction of the compressor bypass branch to the main intake airway. The boost pressure, which is provided by the turbocharger arrangement and which is fed into the internal combustion engine, may be measured roughly at the same position. Exhaust flow and exhaust pressure may be measured by dedicated sensors located in the exhaust system. Depending on an exhaust aftertreatment installation, there may be an additional pressure drop between the low-pressure turbine and the position of the exhaust pressure sensor, which may be located, e.g., in an integrated single brick system. Consequently, the pressure measurement may need to be corrected in order to obtain the pressure downstream the low-pressure turbine. The turbocharger speed, which may be the high-pressure turbocharger speed or the low-pressure turbocharger speed, is measured by a turbocharger speed sensor arranged at the respective turbine or compressor or drive shaft. One or more of such sensors are required for controlling the operation of the turbocharger arrangement. Therefore, one or more corresponding sensor signals are available for evaluation. The selection of sensor signal or signals employed for the evaluation, as well as the procedure of evaluation, may depend on the set of sensors actually available.

The sensor signals mentioned are sensitive to the flow through the low-pressure turbine bypass valve and therefore to the actual state of the low-pressure turbine bypass valve. By evaluating one or a multiplicity of the sensor signals mentioned, a possible failure of the low-pressure turbine bypass valve is readily detectable.

In a preferred manner, the at least one sensor signal is evaluated for determining at least one physical parameter of the turbocharger arrangement, wherein the at least one physical parameter permits detecting a failure mode of the low-pressure turbine bypass valve. More than one sensor signal can be evaluated for determining a physical parameter, and more than one physical parameter can be used for determining the mode of operation of the low-pressure turbine bypass valve. As compared to the sensor signal itself, such a physical parameter may provide an increased magnitude of difference between the normal and failure modes of the low-pressure turbine bypass valve. By employing a physical parameter indicative of a physical condition of the turbocharger arrangement instead of the sensor signal itself, a more reliable distinction between the possible modes of operation of the low-pressure turbine bypass valve and a safer detection of a malfunction of the wastegate is thus achieved.

The at least one physical parameter of the turbocharger arrangement employed for detecting a failure mode of the low-pressure turbine bypass valve may be, for example, the exhaust flow, which may depend on the intake fresh air flow plus the fuel flow, the intake mass airflow, the boost pressure, the exhaust pressure downstream the low-pressure turbine, and/or the low-pressure turbocharger speed. Some of those physical parameters may be directly measured by dedicated sensors. Those parameters are sensitive to the flow through the low-pressure turbine bypass branch and are thus particularly suitable for distinguishing between a normal and a failure mode of the low-pressure turbine bypass valve. In this way, a particularly simple and reliable detection of a failure of the low-pressure turbine bypass valve is achieved. A single one or a combination of such parameters may be employed for this purpose.

As the magnitude of the effect of the low-pressure turbine bypass valve position on the at least one sensor signal and/or on the at least one physical parameter depends on an engine operating point, it is particularly preferred to account for the engine operation point in evaluating the sensor signal and/or the physical parameter for detecting a failure mode of the low-pressure turbine bypass valve. Thus, for example, depending on the engine operating point, different sensor signals or physical parameters may be used to detect a failure of the low-pressure turbine bypass valve. In this way, a failure of the wastegate can be safely detected under a variety of operating conditions of the engine. The engine operation point may be characterized by, for example, the engine speed and/or load. The particular manner to account for the engine operation point may also depend on a calibration of the engine and the characteristics of the components of engine and turbocharger arrangement.

Preferably, the at least one sensor signal is filtered before the evaluation for detecting a possible failure of the low-pressure turbine bypass valve. Alternatively or additionally, a physical parameter or function representative of the mode of operation of the wastegate may be filtered. Such a function is derived by evaluating the at least one sensor signal and may be, for example, a parameter indicating the state of the low-pressure turbine bypass valve or a parameter or error flag indicating the presence of a failure of the low-pressure turbine bypass valve. In a simple case, the function may employ the values 0 or 1, according to the valve state being fully closed or fully open, respectively.

Filtering may be, in particular, time-domain low-pass filtering. Filtering may be per-formed on any level of evaluation, in particular one or more raw sensor signals may be filtered and/or one or more physical parameters derived from the raw sensor signals and/or an error flag representing low-pressure turbine bypass valve failure. Filtering serves to avoid false detection of a failure mode due to, for example, noise or transition states when the valve changes its position from open to closed or vice versa.

According to an embodiment of the present disclosure, the at least one sensor signal is continuously evaluated during operation of the internal combustion engine for detecting a failure mode of the low-pressure turbine bypass valve, i.e. the at least one sensor signal is evaluated in real-time or in short intervals. In this way, the function of the wastegate is continuously monitored to detect a failure as early as possible.

If a failure of the low-pressure turbine bypass valve occurs, this may have considerable consequences for the overall functioning of the turbocharger arrangement. For safety reasons an action may be taken in response to a detection of a failure mode of the wastegate.

In particular, the turbocharger arrangement may be operated in normal operation according to a first control mode. Such a control mode is represented by a sequence or algorithm for controlling actuators available within the turbocharger arrangement for managing its overall operation. When a failure mode of the low-pressure turbine bypass valve is detected, the turbocharger arrangement is controlled according to a second control mode. The second control mode functions in a different way, thereby compensating for the failure. Thus, for example, the second control mode may be such that, in spite of the failure of the low-pressure turbine bypass valve, sufficient power is provided, and a safe operation of the turbocharger arrangement is ensured. In particular, the control mode may be automatically switched by a control unit after detection of the failure. A warning notice may be given to an operator, and the failure may also be stored in a failure memory of the control unit.

The first control mode, i.e. the control mode in normal operation, may be distinct according to the engine speed and/or torque. At low engine speed and/or torque, the bypass valve of the low-pressure turbine is set to the fully closed position, and the bypass valve of the high-pressure turbine is employed for controlling the boost pressure of the turbocharger arrangement, preferably in a closed-loop control, according to an engine operation point. Due to the pressure difference acting, the compressor bypass valve is forced into the fully closed position. In this way, optimal performance in the low-speed/torque domain can be provided, as well as the back pressure required for exhaust gas recirculation.

At higher engine speed and/or torque, the bypass valve of the high-pressure turbine is set to the fully open position, and the bypass valve of the low-pressure turbine is employed for controlling the boost pressure of the turbocharger arrangement, preferably in a closed-loop control employing the boost pressure. The compressor bypass valve moves into the fully open position. In this way, peak power can be provided.

Alternatively, depending on the current engine and/or load and the current position of the compressor bypass valve, both of the low-pressure and the high-pressure turbine valves can be set simultaneously to optimal positions, which may both be intermediate positions between fully closed and fully opened. This means that closed-loop control employing both the low-pressure and the high-pressure turbine valves is performed.

According to an embodiment effective in the low-speed/torque domain, control may be carried out in the normal mode by setting the bypass valve of the low-pressure turbine fully closed and controlling the boost pressure of the turbocharger arrangement by the bypass valve of the high-pressure turbine alone. However, any other low-speed/torque control mode may be applied as well. The compressor bypass valve is fully closed in this mode. When a failure of the low-pressure turbine bypass valve is detected, i.e., in particular, the low-pressure turbine bypass valve is fully open, a second control mode is employed. According to the second control mode, the high-pressure turbine bypass valve is set more closed than it would be in the first control mode. Preferably, a closed-loop control of the high-pressure turbine bypass valve is performed in this way, but with different terms than in the normal mode. In this way, sufficient boost pressure and thus sufficient operation of the turbocharger arrangement can be maintained in spite of the failure of the low-pressure turbine bypass valve.

According to another embodiment effective in the high-speed/torque domain, in the normal mode the bypass valve of the high-pressure turbine is set fully open, and the boost pressure of the turbocharger arrangement is controlled by the bypass valve of the low-pressure turbine alone; however, another high-speed/torque control mode may be applied as well. In this mode the compressor bypass valve is fully open. When a failure of the low-pressure turbine bypass valve is detected, a second control mode is employed, depending on whether the low-pressure turbine bypass valve is stuck fully closed or fully open. If the wastegate is stuck fully closed, the high-pressure turbine bypass valve is set fully open; moreover, in order to avoid overboost, the torque setpoint is limited. If the low-pressure turbine bypass valve is stuck fully open, the high-pressure turbine bypass valve is employed for controlling the boost pressure, similar to the normal low-speed/torque mode. This guarantees sufficient operation of the turbocharger arrangement to maintain engine performance and safe operation of the turbocharger arrangement, in spite of the failure of the low-pressure turbine bypass valve.

In a further embodiment of the disclosure, a vacuum or electric supply of the low-pressure turbine bypass valve is monitored, providing a signal indicative of some failure modes of the wastegate. If a failure is due to failure of the actuator supply, such a signal can be employed for detecting the failure mode. In particular, if the wastegate has a failsafe position, the signal is indicative of the wastegate being in the failsafe position. In this way, the detection of the failure mode and the discrimination between different failure modes is additionally enhanced.

According to a further aspect of the disclosure, a control unit for controlling a turbocharger arrangement of an internal combustion engine is configured to operate according to a method as described above. In particular, the control unit comprises signal input ports for capturing at least one sensor signal from the turbocharger arrangement. The control unit further comprises data processing means and output means for controlling the turbocharger arrangement by operating the actuators of the turbocharger arrangement, which are, in particular, the bypass valves of the low-pressure and the high-pressure turbines. The valves may be operated, for ex-ample, by vacuum or by electric signals. According to the disclosure, the processing means are configured to evaluate the at least one sensor signal for detecting a failure mode of the low-pressure turbine bypass valve, as described above. The processing means may be, in particular, configured for switching automatically from a first control mode to a second control mode upon detection of a failure of the low-pressure turbine bypass valve. Detection of the failure mode and the response to the failure may depend on further parameters, such as engine load and/or speed. The control unit may also comprise a signal output for a warning signal and a failure memory for storing information on the failure mode detected. The control unit may be part of an electronic control unit of the engine.

In the embodiment shown schematically in FIG. 1, an internal combustion engine 1 includes a turbocharger arrangement 2 or turbocharger system comprising a high-pressure turbocharger 3 and a low-pressure turbocharger 4. The high-pressure turbocharger 3 comprises a high-pressure turbine 5 and a high-pressure compressor 6, the compressor 6 being driven by the turbine 5 via a drive shaft 7. The low-pressure turbocharger 4 comprises a low-pressure turbine 8 driving a low-pressure compressor 9 by means of a drive shaft 10. The turbines 5, 8 are arranged sequentially in the exhaust system 11 of the internal combustion engine, the high-pressure turbine 5 being arranged upstream the low-pressure turbine 8, i.e. in a section with higher pressure. Correspondingly, the compressors 6, 9 are arranged sequentially in the intake system 12 of the engine 1, the high-pressure compressor 6 being located downstream the low-pressure compressor 9. The direction of airflow in the intake system 12 and the direction of exhaust flow in the exhaust system 11 are indicated by the arrows 13, 14, respectively. Generally, the high-pressure turbine 5 and the high-pressure compressor 6 are smaller than the low-pressure turbine 8 and the low-pressure compressor 9, respectively. An intercooler 21 is included post the HP compressor. This is indicated symbolically in FIG. 1.

A high-pressure turbine bypass valve 15 (TBV) is arranged in a parallel branch of the exhaust system parallel to the high-pressure turbine 5. Therefore, a full or partial opening of the high-pressure turbine bypass valve 15 creates a bypass for the exhaust flow to partially or completely bypass the high-pressure turbine 5. If the exhaust flow partially or completely passes through the bypass valve 15, the high-pressure turbine 5 is consequently driven at a reduced rate. The operation of the high-pressure turbocharger 3 can thus be controlled by the operation of the TBV 15. For this purpose, the TBV 15 is actively controlled, serving as an actuator in the turbocharger arrangement 2, and may be equipped with a position feedback sensor (not shown). In a similar manner, a low-pressure turbine bypass valve 16 is arranged in a parallel branch of the exhaust system 11 parallel to the low-pressure turbine 8. The low-pressure turbine bypass valve 16 is also denoted "wastegate" (WG). The WG 16 is actively operated, serving as an actuator, and does not comprise a position feedback sensor, and as such may be referred to as a sensorless low pressure turbine bypass valve. However, a sensor for detecting failure of vacuum or electric supply of the WG 16 may be present (not shown).

In the intake system 12, the intake air flows through the low-pressure compressor 9, being compressed in a first stage of compression. Thereafter, the intake air flows through the high-pressure compressor 6 representing a second stage of compression, or through a parallel branch arranged parallel to the high-pressure compressor 6. The parallel branch can be opened or closed by a compressor bypass valve 17 (CBV). The CBV 17 is passive, i.e. operated by the pressure difference acting across it, and may or may not comprise a position feedback sensor. In particular, the CBV 17 has only two positions, which are fully open and fully closed.

The intake air mass flow, the boost pressure, compressor pressure ratio and/or the compressor outlet temperature may be measured by a sensor (or sensors) 18 symbolically indicated in FIG. 1. The engine 1 may be also equipped with an exhaust gas recirculation system, which is not shown in FIG. 1.

The state of the low-pressure turbine bypass valve 16 has a direct or indirect influence on a variety of parameters governing the operation of the turbocharger arrangement 2. Thus, for example, the pressure ratio provided by the low-pressure compressor 9 and the exhaust flow are considerably altered due to opening or closing the WG 16. As well, the speed of the low-pressure turbocharger 4, the boost pressure provided by the turbocharger arrangement 2, and a number of further parameters are influenced by the function of the WG 16. Consequently, such parameters can be employed for detecting a failure of the WG 16.

Controller 112 is shown in FIG. 1 as a conventional microcomputer including: microprocessor unit 102, input/output ports 104, read-only memory 106, random access memory 108, keep alive memory 110, and a conventional data bus. Controller 112 may include instructions that are executable to carry out one or more control routines. Controller 112 is shown receiving various signals from sensors coupled to engine 1, such as input from sensor 15, as well as other sensors not shown in FIG. 1. Example sensors include engine coolant temperature (ECT) from a temperature sensor, a position sensor coupled to an accelerator pedal for sensing accelerator position, a measurement of engine manifold pressure (MAP) from a pressure sensor coupled to the intake manifold, an engine position sensor from a Hall effect sensor sensing crankshaft position, a measurement of air mass entering the engine from sensor (e.g., a hot wire air flow meter), and a measurement of throttle position. Barometric pressure may also be sensed for processing by controller 112. In a preferred aspect of the present description, an engine position sensor may produce a predetermined number of equally spaced pulses every revolution of the crankshaft from which engine speed (RPM) can be determined. Controller 112 may also output signals to various actuators of the engine, such as valves 15, 16, and 17, based on feedback from signals received from the various engine sensors, such as a position sensor of turbine bypass valve 15.

Figure 2:
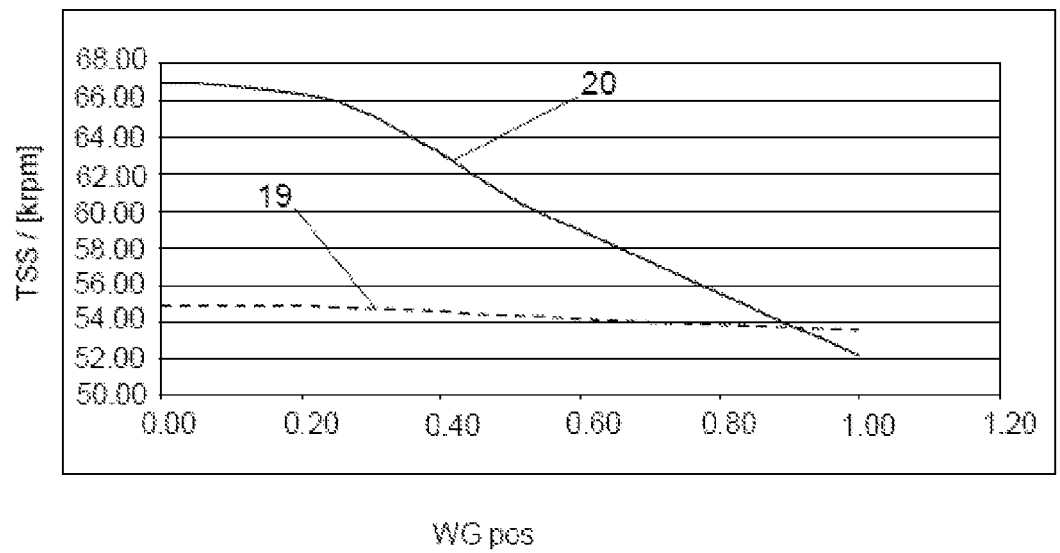
FIG. 2 shows a graphical representation of the dependence of turbocharger speed on the position of the low-pressure turbine bypass valve in an exemplary case at 2000 rpm.

As an example, FIG. 2 shows the turbocharger speed (in 1000 rotations per minute) for the high-pressure turbocharger (curve 19) and for the low-pressure turbocharger (curve 20).

Both curves are drawn depending on the position of the low-pressure turbine bypass valve 16, WG_pos, which is given as a fraction of full opening. As can be seen in FIG. 2, the speed 20 of the low-pressure turbocharger 4 significantly drops with increasing degree of opening of the WG 16, while the speed 19 of the high-pressure turbocharger 3 only slightly varies with WG opening. Conversely, in particular the speed 20 of the low-pressure turbocharger 4 permits determining the opening of the WG 16, including, in principle, intermediate positions. Thus, if the WG 16 is stuck in the fully open or in the fully closed position, or even in an intermediate position, this can be detected by measuring the rotational speed of the low-pressure turbocharger 4. In particular, one or more thresholds can be set, the rotational speed exceeding a first threshold indicating the WG 16 being fully closed, and the rotational speed being below a second threshold indicating the WG 16 being fully open. In the example shown in FIG. 2 and for the set of parameters employed in that case, the first and second thresholds might be set at about 66000 rpm and 53000 rpm, respectively. The rotational speed of the low-pressure turbocharger 4 can be measured by a sensor placed at the low-pressure turbine 8, the low-pressure compressor 9, or the drive shaft 10. Additionally or alternatively the turbocharger speed can be measured by using the corresponding compressor map, if a sensor might not be available.

FIG. 2 shows measurements made at a relatively low engine speed (2000 rpm). At that engine speed, the rotational speed of the low-pressure turbocharger may allow a most reliable detection of a CBV failure. The intake and/or exhaust flows and, in principle, the high-pressure turbocharger speed also allow determination of the WG position. Other parameters, such as compressor efficiency, compressor outlet temperature, or compressor pressure ratio, are less sensitive to the WG state. The boost pressure is usually employed for closing the control loop of the wastegate 16.

Figure 3:
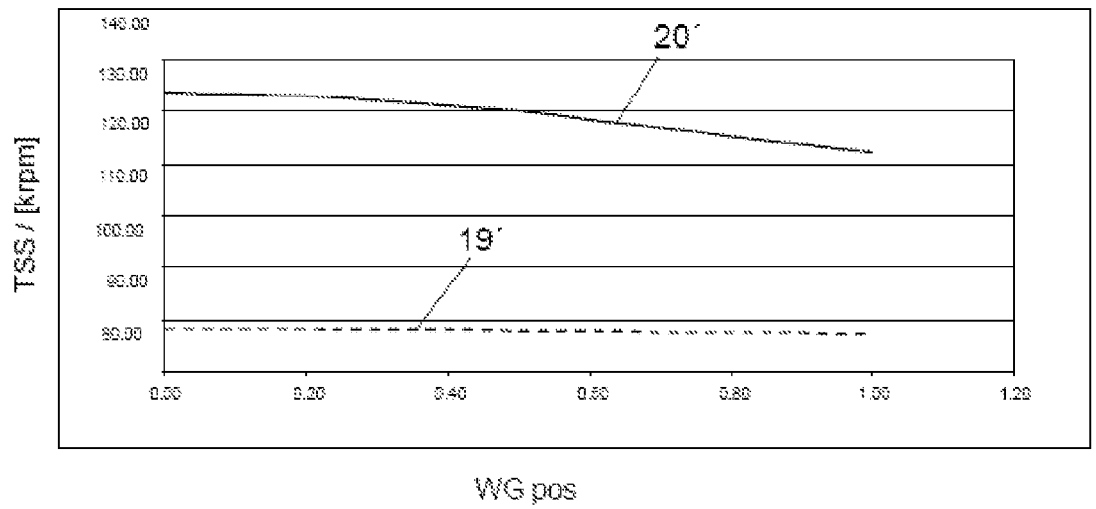
FIG. 3 shows a graphical representation of the dependence of turbocharger speed on the position of the low-pressure turbine bypass valve in an exemplary case at 3500 rpm.

At higher engine speed, for example at 3500 rpm as shown in FIG. 3, the rotational speed (curve 20') of the low-pressure turbocharger 4 still is suitable for determining the opening of the low-pressure turbine bypass valve 16. On the other hand, the high-pressure turbocharger speed (curve 19') varies only by a small amount with the opening of the WG 16 and is unsuitable for this purpose. The intake and/or exhaust flows also allow determination of the WG position. Thus, depending on the engine operation point, and possibly on further parameters, the detection of a failure mode of the low-pressure turbine bypass valve 16 may rely on different sensor signals or parameters of the turbocharger arrangement 2. Moreover, the respective threshold or thresholds set for distinguishing the different states of the WG 16 may depend on a variety of parameters.

In normal operation, i.e. with the low-pressure turbine bypass valve 16 being fully functional, the turbocharger arrangement 2 may be operated depending on the engine speed and/or engine load. In the low-speed/load domain, for example at 2000 rpm and about 6 or 11 bar BMEP, the low-pressure turbine bypass valve 16 is fully closed. Accordingly, the low-pressure turbine 8 is in operation, driving the low-pressure compressor 9 to exert a first-stage compression on the intake air. The high-pressure turbine bypass valve 15 is actuated to a position depending on the power and other requirements to control the rotational speed of the high-pressure turbine 5 driving the high-pressure compressor 6 exerting a second-stage compression on the intake air. The compressor bypass valve 17 is fully closed, due to the pressure difference acting across it, corresponding to the second-stage compression of the intake air. The overall boost pressure generated by the turbocharger arrangement 2 is thus controlled by the position of the TBV 15.

In the high-speed/load domain, for example at 2750 rpm and about 6 bar BMEP, or at 3500 rpm and about 17 bar BMEP, a different mode of control is employed: In this case, the TBV 15 is fully open, reducing the effect of the high-pressure turbo-charger 3 to a minimum. Due to the minimal pressure difference in the second-stage compression, the compressor bypass valve 17 is fully open. The low-pressure turbine bypass valve 16 is actuated to a position for controlling the rotational speed of the low-pressure turbocharger 4 in a closed-loop control employing the boost pressure. Thus, the overall boost pressure of the turbocharger arrangement 2 is controlled by the WG 16 alone in this case. The control of the valves is affected by an electronic control unit, the valves being actuated via electric or vacuum transmission (not shown).

If the low-pressure turbine bypass valve 16 fails, this has severe effects on the operation of the turbocharger arrangement 2 as a whole. In particular, if in the low-speed/torque domain, the WG 16 is stuck in the fully open position, boost pressure will be largely lost. Such a failure mode can be detected, depending on a variety of parameters, by evaluation of the speed sensor signal of the low-pressure turbo-charger 4 or by evaluation of the signal of an airflow or exhaust flow sensor or boost pressure, for example. Additionally, the LP compressor ratio, which consists of interstage pressure and boost pressure, can be used to detect a failure mode. In some cases, the failure mode can also be detected by a signal of a sensor monitoring vacuum or electric supply for actuating the low-pressure turbine bypass valve 16. If a failure of the low-pressure turbine bypass valve 16 is detected, control is automatically switched by the control unit to another control mode. In this control mode, the TBV 15 is more closed than in the normal control mode. Thus, in case of failure of the WG 16 at low engine speed and/or torque, the turbocharger arrangement 2 is controlled in a similar manner as in normal operation, but with reduced opening of the TBV 15. In this way, in spite of the failure of the WG 16, the boost pressure can be maintained to a large extent and remains controllable.

If, on the other hand, in the high-speed/torque domain the low-pressure turbine bypass valve 16 fails, the control mode is automatically switched by the control unit, but depending on the kind of failure. A failure mode is detected as described above. If a failure is detected by a sensor monitoring vacuum or electric supply for the WG 16, it can be assumed that the wastegate 16 is in a pre-determined failsafe position. If the WG 16 is stuck in the fully closed position, the low-pressure turbocharger 4 will be driven maximally, resulting in the risk of an overboost. In the control mode employed after detection of the WG failure, the TBV 15 is set to the fully open position and the torque setpoint map is limited in order to avoid overboost. If the WG 16 is stuck in the fully open position, boost pressure will be largely lost. In this, case, the TBV 15 will be used as the primary boost pressure actuator, being controlled in a closed loop including a boost pressure sensor signal. In spite of the failure of the WG 16, safe and sufficient operation of the turbocharger arrangement 2 can thus be achieved.

Thus, the system of FIGS. 1-3 provides for an engine turbocharger system comprising a high-pressure turbocharger including a first turbine, a first compressor, and a high-pressure turbine bypass valve, a low-pressure turbocharger including a second turbine arranged downstream of the first turbine, a second compressor, a compressor bypass valve, and a wastegate, and a controller including instructions to adjust a position of the high-pressure turbine bypass valve in response to degradation of the wastegate to maintain desired boost pressure. The system may also include further instructions to determine degradation of the wastegate based on a speed of the second turbine, engine load, and engine speed.

Figure 4:
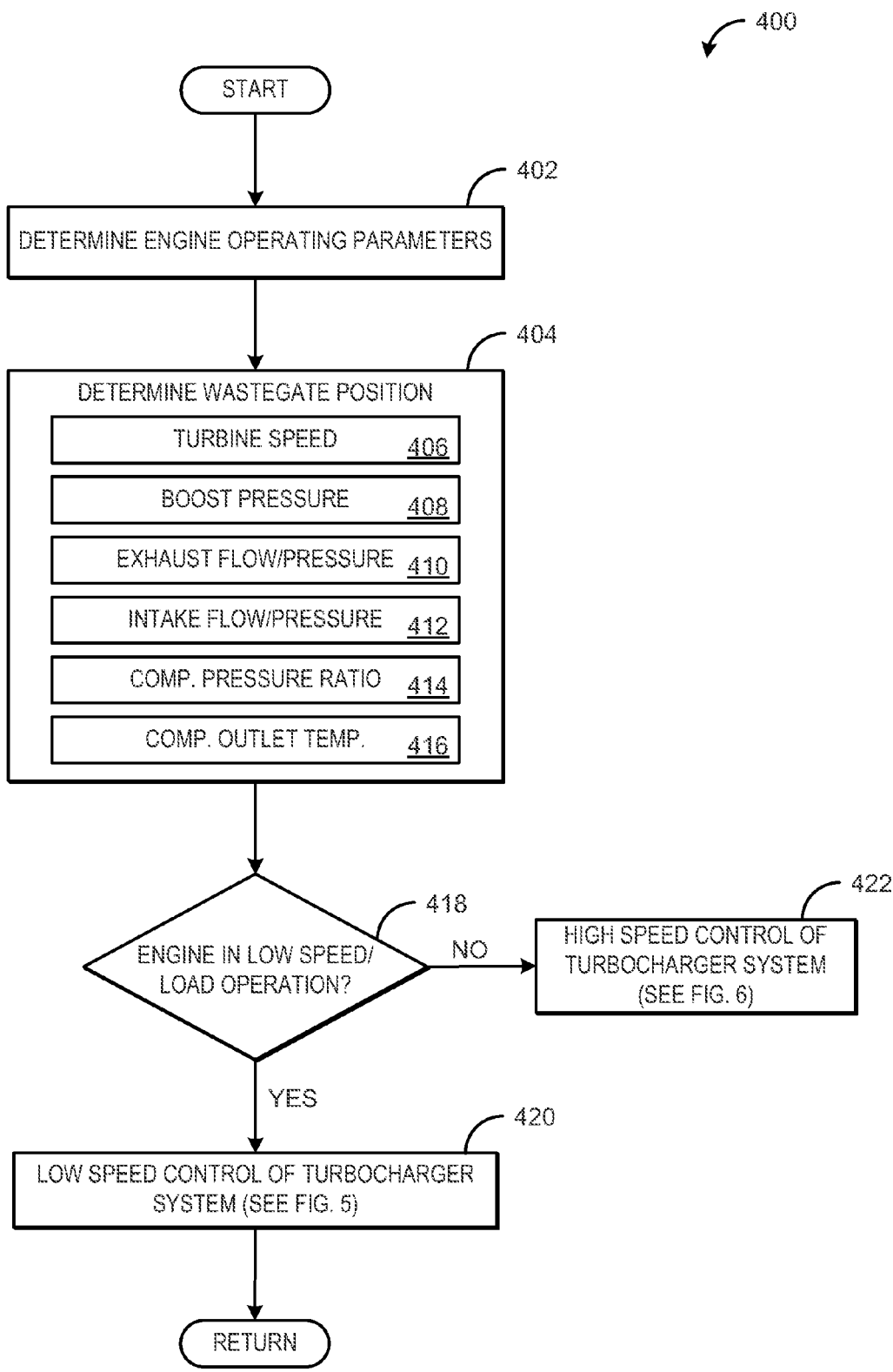
FIG. 4 shows a flow chart illustrating a method for controlling boost pressure according to an embodiment of the present disclosure.

Turning to FIG. 4, a method 400 for controlling boost pressure is provided. Method 400 may be carried out by a control system of the engine, such as controller 112. Method 400 comprises, at 402, determining engine operating parameters. The engine operating parameters may include, but are not limited to, engine speed, load, boost pressure, turbocharger speed, etc. At 404, the position of the wastegate, such as WG 16, is determined. In one embodiment, the wastegate may not include a position sensor to provide position feedback, and thus the position of the wastegate may instead be determined based on engine operating parameters. This may include determining the position of the wastegate based on turbine speed (low-pressure and/or high-pressure speed) at 406, boost pressure at 408, exhaust flow and/or pressure at 410, intake flow and/or pressure at 412, compressor pressure ratio at 414, and/or compressor outlet temperature at 416. Further, the position of the wastegate may be determined by one or more of these factors in an engine speed and/or load-dependent manner.

At 418, method 400 includes determining if the engine is operating under low speed/load conditions. Low speed conditions may include, in one example, engine speeds below a threshold, such as 2500 RPMs. In another example, low speed conditions may be determined based on an engine-speed load map stored in the memory of the controller. If it is determined that the engine is operating in low speed conditions, the boost pressure in the engine is regulated by control of the high-pressure turbocharger, and specifically by the position of the high-pressure turbine bypass valve. Thus, if the engine is in low speed conditions, method 400 proceeds to 420 to control boost pressure in a low speed mode, which will be explained with respect to FIG. 5. If the engine is not operating in low speed conditions, then method 400 proceeds to 422 to control boost pressure in a high speed control mode, explained in detail with respect to FIG. 6. The high speed control mode includes boost pressure being regulated by control of the low-pressure turbine. After determining which control mode to operate in, method 400 returns.

Figure 5:
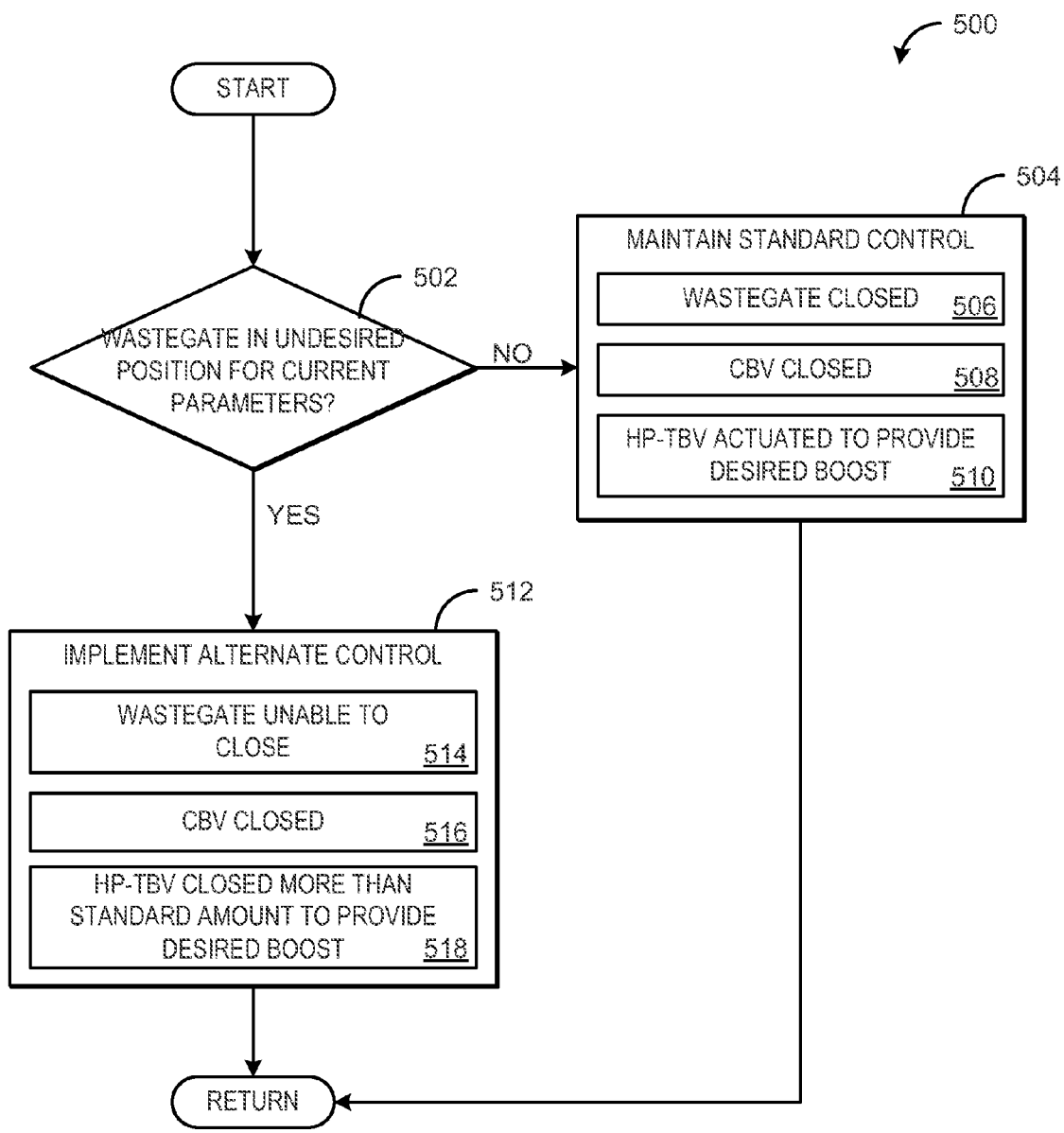
FIG. 5 shows a flow chart illustrating a method for controlling boost pressure during low speed engine operation according to an embodiment of the present disclosure.

FIG. 5 illustrates a method 500 for controlling boost pressure during low speed conditions. Method 500 may be carried out by the controller 112 during low speed conditions, during the execution of method 400 of FIG. 4. At 502, it is determined if the wastegate is in an undesired position for the current engine speed and load. During low speed conditions, the wastegate is maintained in a fully closed position, and thus undesired position may be any position other than fully closed. However, in some embodiments, the undesired position may be a degraded position of the wastegate, e.g., fully open and unable to close.

If the wastegate is not in the undesired position, method 500 proceeds to 504 to maintain standard low speed boost control. This includes the wastegate being fully closed at 506, the CBV being in the closed position at 508, and desired boost pressure maintained by actuating the high-pressure turbine bypass valve (HP-TBV) to a desired position based on operating parameters at 510.

If the wastegate is the undesired position, method 500 proceeds to 512 to implement an alternate low speed boost control. The wastegate may be in the undesired position due to a degradation of the wastegate wherein it is stuck fully open (unable to close) or stuck fully closed (unable to open). If it is stuck fully closed, during low speed operation this is not detectable, as fully closed is the standard, desired position. However, if the determination of the wastegate position indicates it is fully open and unable to close at 514, alternate control may be implemented to compensate for the open wastegate. This may include the CBV being closed at 516 and the HP-TBV being closed more that the amount it would be closed for the operating parameters if the wastegate was not open (e.g., the amount it would be actuated by at 510). In this way, the loss of boost pressure due to the open wastegate may be compensated by closing the HP-TBV to a larger degree than the standard control in order to increase boost through the high-pressure turbocharger. Upon either controlling boost with standard low speed control or controlling boost with the alternate low speed control, method 500 returns.

Figure 6:
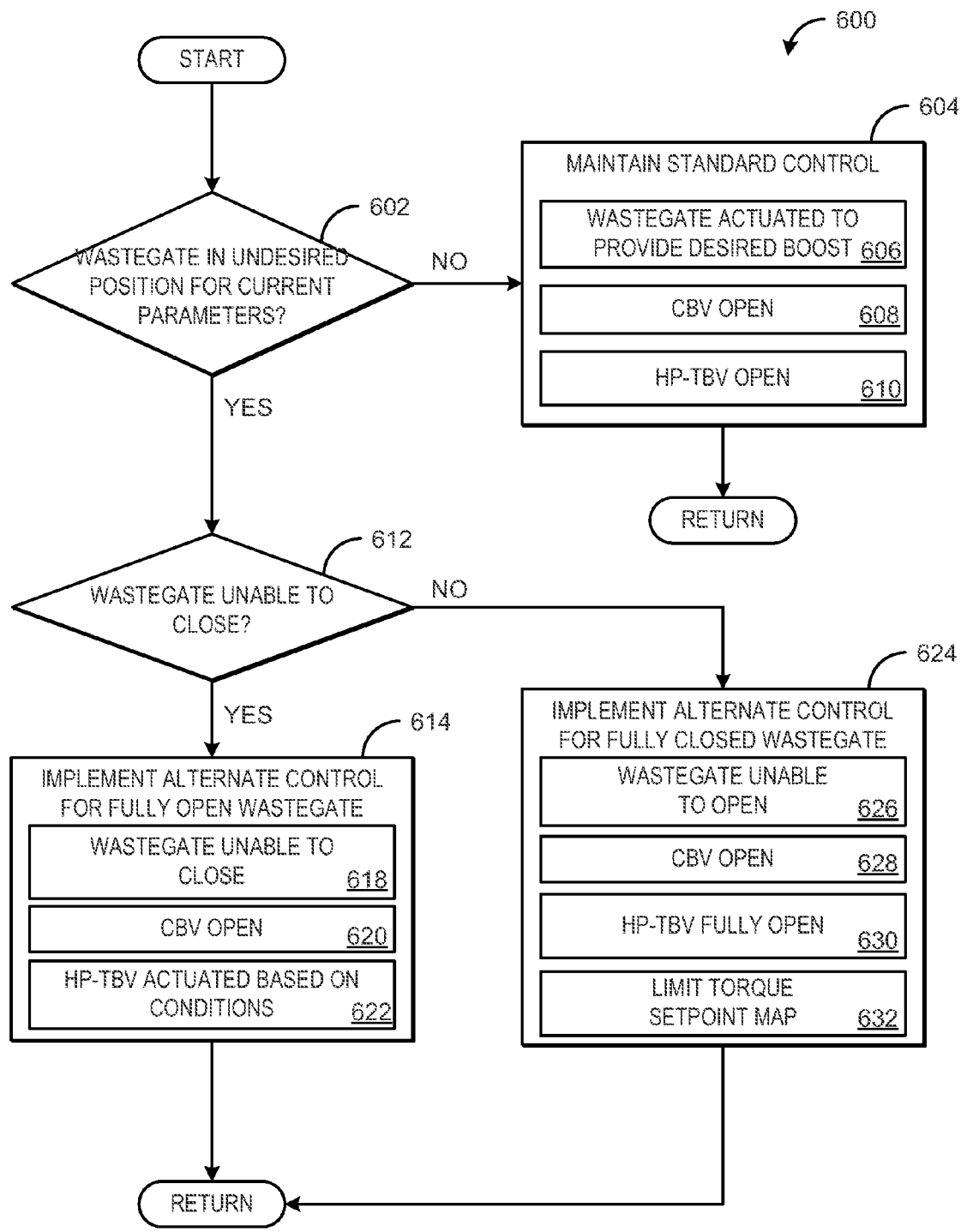
FIG. 6 shows a flow chart illustrating a method for controlling boost pressure during high speed engine operation according to an embodiment of the present disclosure.

FIG. 6 illustrates a method 600 for controlling boost pressure during high speed conditions. Method 600 may be carried out by the controller 112 during high speed conditions, during the execution of method 400 of FIG. 4. At 602, it is determined if the wastegate is in an undesired position for the current engine speed and load. During high-speed conditions, the wastegate may be actuated to a desired position to control boost pressure through the low-pressure turbine. The undesired position may be fully open and unable to close, or it may be fully closed and unable to open.

If the wastegate is not in the undesired position, method 600 proceeds to 604 to maintain standard high speed boost control, which includes the wastegate actuated to provide desired boost at 606, the CBV being open at 608, and the HP-TBV being open at 610. If the wastegate is in the undesired position, method 600 proceeds to 612 to determine if the wastegate is unable to close. If the wastegate is unable to close (e.g., is stuck fully open), method 600 proceeds to 614 to implement an alternate control for controlling boost with a fully open wastegate. This may include the wastegate being fully open and unable to close at 618, the CBV being open at 620, and the HP-TBV being actuated based on operating parameters to maintain desired boost at 622.

If the wastegate is not unable to close, method 600 proceeds to 624 to implement an alternate control for controlling boost pressure with a fully closed wastegate. This may include the wastegate being fully closed and unable to open at 626, the CBV being open at 628, the HP-TBV being fully open at 630, and the torque setpoint map limited at 632. In this way, the exhaust may bypass the high-pressure turbine in order to reduce boost pressure. However, because the low-pressure turbocharger cannot be regulated (and thus the engine may be subject to overboost during some high speed/load conditions) the torque setpoint may be limited to reduce overboost.

Thus, methods 400, 500, and 600 of FIGS. 4-6 provide for a method for a low-pressure turbocharger wastegate comprising during first conditions, closing a high-pressure turbine bypass valve by a first amount in response to the wastegate being unable to close, and during second conditions, actuating the high-pressure turbine bypass valve to maintain a desired boost pressure in response to the wastegate being unable to close. The method may further comprise determining a position of the wastegate based on a speed of the low-pressure turbocharger, engine speed, and engine load. In some embodiments, the method may additionally or alternatively include determining a position of the wastegate based on one or more of exhaust flow, boost pressure, intake flow, compressor pressure, and compressor outlet temperature.

The method may also include, during the second conditions, fully opening the high-pressure turbine bypass valve in response to the wastegate being unable to open; during the first conditions, actuating the high-pressure turbine bypass valve to maintain desired boost pressure in response to the wastegate being in a closed position; and/or during the second conditions, in response to the wastegate being in a desired position, fully opening the high-pressure turbine bypass valve. The first conditions may comprise low engine speed and low engine load, and the second conditions may comprise high engine speed and high engine load.

In this way, the high-pressure turbine bypass valve may be controlled differentially depending on speed and load conditions, and may further be controlled differentially depending on a degradation position of the wastegate. By doing so, desired boost pressure may be maintained even during degradation of the wastegate. For example, during low speed and load conditions, if the wastegate is unable to close (e.g., is stuck fully open), the high-pressure turbine bypass valve may be closed by a first amount. This first amount may be an amount that is greater than an amount the high-pressure turbine bypass valve would be closed if the wastegate was not degraded (e.g., able to close) during the low speed and load conditions.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a turbocharger system of an internal combustion engine including an electronic control unit including non-transitory instructions stored in memory, comprising:
    evaluating via the electronic control unit at least one sensor signal of the turbocharger system for detecting a failure mode of a sensorless low-pressure turbine bypass valve coupled across a low-pressure turbine, the low-pressure turbine positioned downstream of a high-pressure turbine, the turbines arranged sequentially in an exhaust path, the at least one sensor signal continuously evaluated during operation of the internal combustion engine for detecting the failure mode of the sensorless low-pressure turbine bypass valve; and
    upon detection of the failure mode of the sensorless low-pressure turbine bypass valve, adjusting a high-pressure turbine bypass valve coupled across the high-pressure turbine via the electronic control unit to maintain a desired boost pressure.

2. The method according to claim 1, wherein the at least one sensor signal is a signal representative of intake mass air-flow, boost pressure, compressor pressure ratio, compressor outlet temperature, exhaust flow, exhaust pressure downstream of the low-pressure turbine, and/or turbocharger speed.

3. The method according to claim 1, further comprising evaluating the at least one sensor signal to determine at least one physical parameter of the turbocharger system, the at least one physical parameter being discriminative with respect to a mode of operation of the sensorless low-pressure turbine bypass valve.

4. The method according to claim 3, wherein the at least one physical parameter of the turbocharger system is exhaust flow, intake mass airflow, boost pressure, exhaust pressure downstream of the low-pressure turbine, and/or low-pressure turbocharger speed.

5. The method according to claim 1, further comprising evaluating via the electronic control unit the at least one sensor signal of the turbocharger system to detect the failure mode of the sensorless low-pressure turbine bypass valve depending on an engine operating point.

6. The method according to claim 1, wherein the at least one sensor signal and at least one physical parameter of the turbocharger system and a function representative of a mode of operation of the sensorless low-pressure turbine bypass valve is filtered.

7. The method according to claim 1, further comprising operating the turbocharger system according to a first control mode and upon detection of the failure mode of the sensorless low-pressure turbine bypass valve, operating the turbocharger system according to a second control mode.

8. The method according to claim 7, wherein the first control mode is a low-speed/torque control mode and in the second control mode the high-pressure turbine bypass valve is set more closed than in the first control mode.

9. The method according to claim 8, wherein the first control mode is a high-speed/torque control mode and, if the failure mode of the sensorless low-pressure turbine bypass valve is fully closed, the high-pressure turbine bypass valve is set fully open and a torque setpoint is limited, and/or if the failure mode of the low-pressure turbine bypass valve is fully open, a boost pressure is controlled by the high-pressure turbine bypass valve.

10. The method according to claim 1, further comprising evaluating via the electronic control unit a supply signal of the sensorless low-pressure turbine bypass valve to determine the failure mode of the sensorless low -pressure turbine bypass valve.

11. A method for controlling a low-pressure turbocharger wastegate for a turbocharger system for an engine including a high-pressure turbocharger, comprising:
    during first conditions of engine operation, closing a high-pressure turbine bypass valve by a first amount in response to the wastegate being unable to close via an electronic control unit including non-transitory instructions stored in memory;
    during second conditions of engine operation, actuating the high-pressure turbine bypass valve to maintain a desired boost pressure in response to the wastegate being unable to close via the electronic control unit; and
    wherein the first conditions comprise at least low engine speed and the second conditions comprise at least high engine speed.

12. The method of claim 11, further comprising determining engine speed and wherein the low engine speed comprises an engine speed being below a threshold, and the high engine speed comprises the engine speed being at or above the threshold.

13. The method of claim 12, further comprising determining a position of the wastegate based on a speed of the low-pressure turbocharger wastegate, engine speed, and engine load.

14. The method of claim 12, further comprising, during the second conditions, fully opening the high-pressure turbine bypass valve in response to the wastegate being unable to open.

15. The method of claim 12, further comprising, during the first conditions, actuating the high-pressure turbine bypass valve to maintain desired boost pressure in response to the wastegate being in a closed position.

16. The method of claim 12, further comprising, during the second conditions, in response to the wastegate being in a desired position, fully opening the high-pressure turbine bypass valve.

17. The method of claim 12, wherein the first conditions comprise low engine speed and low engine load, and wherein the second conditions comprise high engine speed and high engine load.

18. An engine turbocharger system, comprising:
a high-pressure turbocharger including a first turbine, a first compressor, and a high-pressure turbine bypass valve;
a low-pressure turbocharger including a second turbine arranged downstream of the first turbine, a second compressor, a compressor bypass valve, and a wastegate; and
a controller including non-transitory instructions stored in memory to:
determine degradation of the wastegate based on an undesired wastegate position for a current engine speed and load; and
when the wastegate is stuck open and unable to close during low speed and load conditions, close the compressor bypass valve and adjust a position of the high-pressure turbine bypass valve in response to degradation of the wastegate to maintain desired boost pressure.

19. The engine turbocharger system of claim 18, wherein degradation of the wastegate is determined based on a speed of the second turbine, engine load, and engine speed, and wherein the controller includes further instructions to, when the wastegate is stuck open and unable to close during high speed and load conditions, open the compressor bypass valve and adjust a position of the high-pressure turbine bypass valve to maintain desired boost pressure.

* * * * *